United States Patent [19]
Ourth et al.

[11] Patent Number: 6,110,999
[45] Date of Patent: Aug. 29, 2000

[54] REUSABLE ADHESIVE COMPOSITION AND METHOD OF MAKING THE SAME

[75] Inventors: Darren Lee Ourth, Cameron; Jess Rogers, Excelsior Springs; Jeffrey J. Richerson, Holt, all of Mo.

[73] Assignee: Denovus LLC, Excelsior Springs, Mo.

[21] Appl. No.: 09/264,226

[22] Filed: Mar. 5, 1999

Related U.S. Application Data

[60] Provisional application No. 60/077,118, Mar. 6, 1998, and provisional application No. 60/109,774, Nov. 25, 1998.

[51] Int. Cl.$^7$ .................. C08K 5/15; C08K 5/10
[52] U.S. Cl. .................. 524/114; 524/315; 524/322; 524/364; 524/390; 524/391; 524/434; 524/469; 524/485; 524/492; 524/508; 524/522; 524/524; 524/525; 524/526; 524/528

[58] Field of Search ...................... 524/114, 315, 524/322, 364, 390, 391, 434, 469, 485, 492, 508, 522, 524, 525, 526, 528

[56] References Cited

U.S. PATENT DOCUMENTS 3,654,005   4/1972   Higgins et al. .................. 156/108

*Primary Examiner*—Kriellion Sanders
*Attorney, Agent, or Firm*—Michael K. Boyer

[57] ABSTRACT

A composition is disclosed that comprises at least one base polymer, at least one resin and optionally one or more additives such as a filler, colorant, among other additives. The disclosed composition can applied by spraying, immersion, brushing, rolling onto the adherent surface; caulking, among other methods of application.

21 Claims, 1 Drawing Sheet

REUSABLE ADHESIVE COMPOSITION AND METHOD OF MAKING THE SAME

The subject matter herein claims benefit under 35 U.S.C. 111(a), 35 U.S.C. 119(e) and 35 U.S.C. 120 of Provisional U.S. Patent Application Ser. Nos. 60/077,118, filed on Mar. 6, 1998 and 60/109,774, filed on Nov. 25, 1998, and entitled "Reusable Adhesive Composition and Method of Making the Same". The disclosure of the previously identified Provisional Patent Applications is hereby incorporated by reference.

FIELD OF THE INVENTION

The instant invention relates to a reusable adhesive composition and methods of making the composition.

BACKGROUND OF THE INVENTION

Reusable adhesives are known in this art. Conventional adhesives are undersirable in that such adhesives are prone to leaving stains or other unsightly marks once removed from an adherent surface, e.g., painted wallboard. Conventional reusable adhesives fail to retain an adhesive quality over an extended period of time.

SUMMARY OF THE INVENTION

The instant invention solves problems associated with conventional reusable adhesives by providing a composition that is non-toxic, substantially stain-free and reusable over an extended period of time. Normally, the adhesive is removed by rolling the adhesive in a direction parallel to the adherent surface.

The composition comprises at least one base polymer, at least one resin and optionally one or more additives such as a filler, colorant, among other additives. In one aspect of the invention, the composition is colorant-free and has a translucent or gel appearance. The composition can be fabricated into a wide range of configurations; sprayed, dipped or rolled onto the adherent surface; employed as a bulk material, e.g., a caulk or sealant, among other methods of usage.

DETAILED DESCRIPTION

Figure 1:
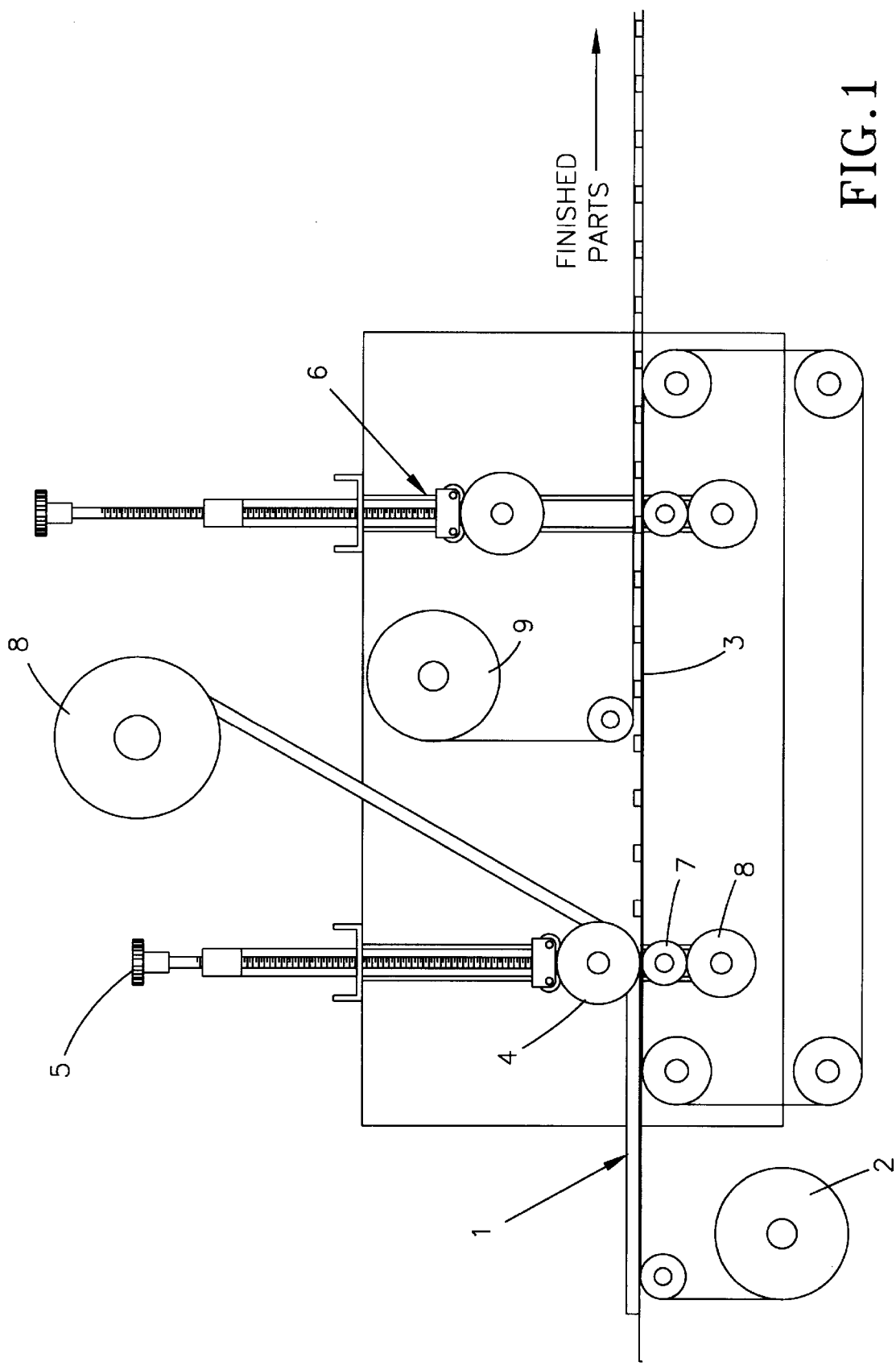
FIG. 1 is a schematic drawing of one aspect of the inventive method that employs a rotary die for producing shaped articles of the invention.

The inventive adhesive can be used as a replacement for conventional adhesives in order to hang posters, pictures, recipes, decorations, paper, balloons, memos, keys; seasonal items such as greeting cards, lighting; among other items upon a vertical surface such as wall board. The inventive adhesive can be employed to affix an article upon a horizontal surface, e.g., a computer keyboard, rolodex, mouse pads, monitors, items on shelves, candles within candle holders, articles of commerce during shipment, among other end-uses. The inventive adhesive can also be employed as an adhesive in hobby and crafts, to fill in holes, sealant compounds for retaining nuts and screws in an engaged position, a packaging adhesive, among other end-uses.

The inventive composition can be applied by any suitable method onto a wide range of adherent surfaces. Examples of such adherent surfaces comprise at least one member selected from the group consisting of metal, plastic, paper, concrete, wood, among other surfaces.

The composition comprises at least one base polymer and at least one resin. The base polymer can range from about 25 to about 90 wt. % of the composition. Any suitable base polymer can be employed such as at least one member selected from the group consisting of ethylene propylene rubber, polyisobutylene, ethylene vinyl acetate, polyacrylic rubber, combinations thereof, among others. Normally for best results, the base polymer comprises ethylene propylene rubber in an amount of about 25 to about 40% of the composition.

The inventive composition comprises at least one resin such as a hydrogenated hydrocarbon, polybutene, phenolic resins, combinations thereof, among others. The amount of resin can range from about 1 to about 30 wt. % of the composition. For best results, the resin comprises a hydrogenated hydrocarbon, and normally comprises about 10 to about 20 wt. % of the composition.

The inventive composition can further comprise at least one copolymer. While any suitable copolymer can be employed for making the inventive composition, examples of suitable copolymer comprise at least one member selected from the group consisting of amorphous propylene copolymer, polyisobutylene, micro-crystalline waxes, combinations thereof, among others. For best results, the copolymer comprises an amorphous propylene copolymer. The amount of copolymer ranges from about 5 to about 65 wt. % of the composition, and normally about 40 to about 60% of the composition.

The inventive composition can also comprise one or more natural or more natural or synthetic oils. Examples of such oils comprise at least one member selected from the group consisting of polyalphaolefin, polybutene and natural oils. Examples of natural oils comprise at least one member selected from the group consisting of vegetable oil, epoxidized vegetable oil, castor, linseed, soybean oil, methylated esters of soybean oil, among others. Soy bean based oils and related products are preferred, e.g., soybean oil, methylated esters of soybean oil, epoxidized vegetable oils mixtures thereof, among others. The amount of oil ranges from about 1 to about 20 wt. % and normally ranges from about 3 to about 10 wt. %

If desired, the inventive composition can further comprise one or more optional additives selected from the group consisting of a colorant, a filler such as fumed silica, precipitated silicas, alumina trihydrate, steric acid, antimicrobial compounds, combinations thereof, among others. Normally, the amount of additive present in the filler corresponds to about greater than about 0 to about 10 wt. % of the invention, e.g., about 2 wt. %.

If desired, the inventive composition can be employed as liquid composition by being added to a solvent or diluent such as at least one member selected from the group consisting of xylene, methanol, toluene, mineral spirits, acetone, d'Limonene, butyl acetate, brominated solvents, mixtures thereof, among others. The amount solvent/diluent comprises about 10 to about 75 wt. % of the sprayable composition and normally about 40 to about 75 wt. % of the liquid or solvated composition. The liquid composition can be applied by brushing, spraying, rolling, immersing an adherent surface into the composition, among other conventional methods for applying a coating. Depending upon the amount of diluent, the solvated composition can be employed as a caulk or sealant in accordance with conventional methods.

The solvated composition can also be dispensed via aerosol by packaging the composition with a suitable propellant. Examples of suitable propellants comprise at least one member selected from the group consisting of fluorinated propellants such as HFC-152a; hydrocarbons such as propane, butane, isobutane, pentane, mixtures thereof; nitrogen, carbon dioxide; mixtures thereof, among others. In this aspect, the propellant comprises about 15 to about 30 wt. % of the dispensed composition. The solvated composition can be packaged into an aerosol by using conventional methods.

The components of the inventive composition can be blended and shaped by using any suitable methods or apparatus. Examples of methods for blending the components comprise using a banbury mixer, sigma bland mixer, double arm mixer, among others. Examples of methods for shaping the composition comprise extruding, rotary pressing, stamping, cutting, laminating, molding, combinations thereof, among others.

While any suitable mixing and extruding apparatus can be employed, normally the components of the composition are mixed under conditions and for a time sufficient to obtain a substantially homogenous mixture. While it is not necessary, for best results the components of the inventive composition are combined in a vacuum mixer. An example of a suitable mixer comprises a double arm mixer supplied by Baker Perkins. The mixer can be operated at any suitable vacuum; but normally about 20 to about 30 inches of vacuum. The mixed components or composition are heated to a temperature sufficient to form an extrudable mass, e.g., about 90 to 180 F. The extrusion pressure can range widely and is dependent upon the line speed, e.g., a width of 5 inches at a rate of about 100 to about 160 inches per minute; viscosity and width of the extrudant. The extrudant exists the extruder and normally contacts a release liner, e.g., a coated paper, high density polyethylene or polypropylene. Typically, the inventive composition is mixed, extruded into a desired shape and then cut to length with a guillotine. If desired, the composition can be extruded into strips that are embossed with a roller die and cut to a predetermined length. While any suitable die or rotary die system can be employed, the rotary die disclosed in co-pending and commonly assigned U.S. Provisional Patent Application Ser. No. 60/083,290, filed on Apr. 28, 1998 in the name of Steven K. Frendle et al. and entitled "Method and Apparatus For Die Cutting and Making Laminate Articles" (now U.S. Patent Application Ser. No. 09/300,387, filed on Apr. 27, 1999), is preferred. The disclosure of U.S. Provisional Patent Application Ser. No. 60/083,290 (now U.S. Patent Application Ser. No. 09/300,387, filed on Apr. 27, 1999) is hereby incorporated by reference.

The inventive composition can be fabricated into a virtually unlimited array of configurations and shapes. For most applications, it is desirable to employ the adhesive in a form having a relatively high surface area, e.g. relatively then shapes or strips. An example of a suitable shape comprises a circle or dot that has a diameter relatively large in comparison to the thickness of the circle/dot, triangles, stars, squares, decorative configurations, among others. The inventive composition can also be embossed or pressed into a wide range of surface designs and textures.

Certain aspects of the invention are better understood by reference to the Drawing. Referring now to FIG. 1, FIG. 1 illustrates schematically a process for extruding and shaping the inventive composition. AN extrudable composition 1 of the invention is extruded in accordance with conventional methods onto a polyethylene release layer 2 that is transported by conveyor 3. The conveyor 3 includes openings (not shown) through which a vacuum is drawn in order to maintain release layer 2 in contact with the conveyor 3. The composition is conveyed to rotary die 4. Rotary die 4 comprises height/pressure adjustment means 5. Adjustment means 5 comprises a threaded member that raises or lowers rotary die 4 in response to rotating a knob (or other means for operating the threaded member). Rotary die 6 is shown in a raised or inoperative position. If desired, rotary die 6 can be employed in combination with die 4 to perform a secondary shaping operation.

The extruded composition 1 is shaped by being passed underneath rotary die 4 and an anvil roller 7. Anvil roller 7 is in rotational contact with a support roller 8. Support roller 8 is driven by a motor (not shown) and causes anvil roller 7 to rotate while also supporting anvil roller 7. As the extruded composition 1 is passed under rotary die 4, die 4 cuts through the composition 1 without affecting release layer 2. The die 4 includes recesses having a shape that define the depth of cut as well as the configuration of the shaped composition 1 exiting die 4. The die 4 can be heated/cooled and include a means for drawing a vacuum within the recesses. The composition 1 exiting die 4 has a defined shape, e.g., 0.5 inch diameter circular shapes, continuous strips, among other desired shapes.

The waste material 8 (so-called flash) is removed overhead while the shaped composition 1 continues to be transported by conveyor 3. If desired, the waste material 8 is recycled back to the extruder (not shown). The waste material 8 is pulled upward and away from the die 4 by any suitable means such as a vacuum, roller, among other means. A top release liner 9 comprising polyethylene is applied upon the cut extruded composition 1. Depending upon the characteristics of the finished product, the top release liner can be applied before or after passing the cut extruded composition 1 through the secondary rotary die 6. The top and bottom release liner containing the cut extruded material was sectioned into predetermined lengths by using the guillotine cutter (or other conventional means-not shown). The sections are then removed from the vacuum conveyor either manually or by conventional removal/staking means.

While the above description places particular emphasis upon an extrudable material for use as an adhesive, the subject matter of the instant invention can be employed in a wide range of end-uses such as a caulk, sealant, packaging material, among other uses. The inventive composition can also be employed as a composite material wherein the above composition serves as a matrix to embed secondary materials. Examples of secondary materials can comprise one or more of fastening means such as hooks, magnets, screws, among others that are embedded within the composition, particular or fibrous materials for imparting improved physical properties, among other materials.

The following Examples are provided to illustrate the novel invention and limit the scope of the invention as defined by the appended claims. Unless indicated to the contrary, commercially available materials and equipment are used.

EXAMPLES 1–3

The following translucent composition were prepared admixing the components in a Baker double arm sigma mixture at a temperature of 180 to 250 F. The components were added in the sequence and under the conditions described in greater detail in Example 6.

EXAMPLE 1

| AMOUNT | COMPONENT | PRODUCT NAME | SUPPLIER |
|---|---|---|---|
| 31 wt. % | ethylene propylene rubber | Vistalon 404 | Exxon |
| 52% | amorphous propylene copolymer | A.P.A.O. | Rexene |
| 17% | hydrogenated hydrocarbon | Regalite | Hercules |

Example 1 was repeated with the exception that the composition comprised 33 wt. % propylene rubber, 54% propylene copolymer and 13% hydrocarbon.

Acceptable compositions can also be obtained by using from about 45 to about 75 wt. % rubber, about 25 to about 60 wt. % copolymer and about 11–25 wt. % hydrocarbon resin.

EXAMPLE 2

| AMOUNT | COMPONENT | PRODUCT NAME | SUPPLIER |
|---|---|---|---|
| 55 wt. % | ethylene propylene rubber | Vistalon 404 | Exxon |
| 27% | amorphous propylene copolymer | A.P.A.O. | Rexene |
| 18% | polybutene | H300 | Amoco |

Acceptable compositions can also be obtained by using from about 45 to 75 wt. % rubber, about 25 to about 60 wt. % copolymer and about 10 to about 30 wt. % hydrocarbon resin.

EXAMPLE 3

| AMOUNT | COMPONENT | PRODUCT NAME | SUPPLIER |
|---|---|---|---|
| 86 wt. % | polyacrylic polymer | HyTemp | Zeon |
| 1% | fumed silica | Cabosil | Cabot |
| 9% | amorphous propylene copolymer | A.P.A.O. | Rexene |
| 4% | polybutene | H300 | Amoco |

Acceptable compositions can also be obtained by using from about 60 to about 90 wt. % rubber, about 0 up to about 5 wt. % silica (or other suitable filler), about 5 to about 40 wt. % copolymer and about 2 to about 20 wt. % hydrocarbon resin.

EXAMPLE 4

The compositions prepared in accordance with Examples 1–3 were repeated with the exception that a colorant was added during admixing. These colored compositions were prepared by adding 1 to 10 wt. %, at one percent weight intervals, of Akrochem fluorescent pigments.

EXAMPLE 5

A composition comprising 205 lbs ethylene-propylene monomer (available commercially as Vistalon® 404), 343 lbs. amorphous propylene copolymer (available commercially as A.P.A.O.® 2750), and 112 lbs. hydrogenated hydrocarbon resin (available commercially as Regalite® T1140) was prepared. The components of the composition were mixed together in a 300 gallon Aaron double arm sigma mixer having a carbon steel jacketed bowl, a 250 HP motor and a vacuum cover. The components were mixed in accordance with the following schedule:

| STEPS | MATERIAL | POUNDS | MIXING TIME | MIXING TEMP °F. |
|---|---|---|---|---|
| STEP 1: | Vistalon 404 | 205 lbs. | 20 min. | 175–250 |
| STEP 2: | Regalite T1140 | 20 lbs. | 20 min | 180–250 |
| STEP 3: | Regalite T1140 | 32 lbs. | 15 min | 180–250 |
| STEP 4: | Regalite T1140 | 60 lbs. | 20 min. | 180–250 |
| STEP 5: | A.P.A.O. RT2730 | 25 lbs. | 10 min. | 180–250 |
| STEP 6: | A.P.A.O. RT2730 | 43 lbs. | 10 min. | 180–250 |
| STEP 7: | A.P.A.O. RT2730 | 50 lbs. | 10 min. | 180–250 |
| STEP 8: | A.P.A.O. RT2730 | 75 lbs. | 15 min. | 180–250 |
| STEP 9: | A.P.A.O. RT2730 | 75 lbs. | 15 min. | 180–250 |
| STEP 10: | A.P.A.O. RT2730 | 75 lbs. | 15 min. | 180–250 |

After mixing the components of the composition, the composition was extruded in a Bonnet 4 inch screw extruder having a 28 inch barrel, 7:1 L/D ratio, 20 HP reeves van drive and two (2) chromolox temperature controllers and a manual screen changer. The extrudant was cut into approximately 2 inch long pieces by using a guillotine-style cutter.

EXAMPLE 6

The physical properties of the composition disclosed in Example 1 was analyzed. The specific gravity of the composition was 1.10–1.20 g/ml as determined by ASTM D297. The penetration at room temperature by a 300 gram load was 45–60 mm as determined by ASTM D5 (measured in 0.1 mm and reported as a whole number). The "button tensile" strength of the composition was 60–75 psi as determined by ASTM D907. The static load of the composition was determined on a conventional wall board that had been painted by Sermin-Williams white semi-gloss paint. A static load of 100 grams was held by a one-inch square of the composition for a period of 150 hours. The composition was determined to be non-toxic in accordance with ASTM D-4236.

EXAMPLE 7

The process of the previous Example 5 was repeated and the extrudant was cut into 0.5 inch diameter circular shapes measuring by using a rotary die cutting system illustrated in FIG. 1 and described in greater detail in the aforementioned U.S. Provisional Patent Application Ser. No. 60/083,290 (now U.S. Patent Application Ser. No. 09/300,387, filed on Apr. 27, 1999). As illustrated in FIG. 1 the reuseable adhesive was extruded upon a bottom release liner of polyethylene. The extruded material was then shaped by being passed, via a vacuum conveyor, under a rotary die wherein the die rolls across the surface of the material and cuts through the material (but not the underlying release liner). The waste material was removed overhead and recycled back to the extruder. A top release liner comprising polyethylene, was applied upon the cut extruded material. The top and bottom release liner containing the cut extruded material was sectioned into predetermined lengths by using the guillotine cutter described in Example 5. the sections are then removed from the vacuum conveyor.

EXAMPLE 8

This Example illustrates a transparent adhesive. The components listed below were combined in accordance with the method described above in connection with Example 1. The admixed components were then admixed in accordance with Example 5.

| Component | Wt. % | Chemical Name | Supplier |
|---|---|---|---|
| Vistalon 404 | 32 | ethylene propelene rubber | Exxon Chemical |
| Regalite T1140 | 12 | hydrocarbon resins | Hercules |
| Poly Alfa Omega2730 | 51 | alfa poly amega olfin | Huntsman |
| Industrene R | 1 | steric acid | Witco |
| Soybean oil | 4 | soybean oil | Cargill Inc. |

EXAMPLE 9

This Example illustrates that the inventive composition can be solvated. The composition described in Examples 1, 2 and 5 were contacted and mixed by hand into commercially available d'Limonene, acetone, mineral spirits, butyl acetate and 1-bromopropane. The amount of solvent was 40 to 75 wt. % at 5 wt. % intervals. The resultant mixture was a liquid having a viscosity of 5,000 to 20,000 cps.

The solvated composition could be obtained in a commercially available ribbon type or a dough type mixer. The inventive composition is readily solvated by organic-type solvents and therefore the solvating sequence is not critical.

EXAMPLE 10

This Example illustrates obtaining an aerosol spray of the inventive composition. The composition described in Example 5 was solvated with 1-bromopropane (supplied commercially as Ensolve® by EnviroTech is a non-VOC solvent) in accordance with Example 9. The solvated composition was added to a commercially available aerosol package or can, and aerosolized with a propellant comprising A-70 (Propane/Isobutane mix). The aerosolized composition comprised 50 wt. % solvent (Ensolve®), 20%.propellant (A-70) and the remainder the aforementioned composition. The aerosolized composition was aerosolized and effectively sprayed.

The following is claimed:

1. A composition comprising a base polymer comprising at least one member chosen from the group of ethylene propylene rubber, ethylene vinyl acetate and polyacrylic rubber, a resin comprising at least one member chosen from the group of hydrogenated hydrocarbon, and polybutene; at least one member chosen from the group of amorphous propylene copolymer and micro-crystalline waxes, and optionally at least one additive.

2. A composition comprising a combination of a base polymer comprising ethylene propylene rubber, at least one hydrocarbon resin, at least one amorphous propylene copolymer, at least one solvent and optionally at least one additive.

3. A composition comprising a combination of a base polymer chosen from the group of ethylene propylene rubber, polyisobutylene, ethylene vinyl acetate and polyacrylic rubber; a resin comprising at least one member chosen from the group consisting of hydrogenated hydrocarbon and a polybutene, at least one oil, and optionally at least one additive.

4. The composition of claim 3 wherein said at least one oil comprises a member chosen from the group of polyalphaolefin, polybutene, vegetable oil, epoxidized vegetable oil, castor, linseed, soybean oil and methylated esters of soybean oil.

5. The composition of claim 4 wherein the oil comprises at least one of soybean oil and methylated esters of soybean oil.

6. The composition of claim 2 wherein said at least one solvent comprises at least one member chosen from the group of xylene, methanol, toluene, mineral spirits, acetone, d'Limonene, butyl acetate and brominated solvents.

7. The composition of claim 2 further comprising at least one additive selected from the group consisting of a colorant, fumed silica, precipitated silicas, alumina trihydrate, steric acid and antimicrobial compounds.

8. The composition of claim 6 wherein the solvent comprises d'Limonene.

9. The composition of claim 6 wherein the solvent comprises 1-bromopropane.

10. The composition of claim 2 wherein the composition has a tensile strength as determined by ASTM D907 of greater than about 60 psi.

11. The composition of claim 2 wherein the composition has a specific gravity of greater than about 1.10 g/ml.

12. The composition of claim 5 wherein the oil comprises soybean oil.

13. The composition of claim 1 wherein the composition is non-toxic as defined by ASTM D-4236.

14. The composition of claim 1 wherein the composition is translucent.

15. The composition of claim 1 wherein the composition defines a predetermined shape.

16. The composition of claim 2 further comprising ethylene vinyl acetate.

17. The composition comprising at least one base polymer, at least one resin, at least one solvent, at least one additive and soybean oil.

18. The composition of claim 1 wherein said composition contacts a release liner.

19. The composition of claim 1 wherein said additive comprises at least one fluorescent colorant.

20. The composition of claim 1 further comprising steric acid.

21. The composition of claim 1 further comprising at least one propellant in an amount effective to aerosolize the composition.

* * * * *